United States Patent Office 3,236,583
Patented Feb. 22, 1966

3,236,583
POLYESTER DYEING WITH A DYE SOLUTION CONTAINING POLYALKYLENE OXIDE ETHER OF PHENOLS AND A FATTY ACID ESTER OF POLYALKYLENE OXIDES
Walter Hees, Cologne-Hohenberg, Germany, assignor to Farbenfabriken Bayer Aktiengesellschaft, Leverkusen, Germany, a corporation of Germany
No Drawing. Filed Dec. 28, 1962, Ser. No. 247,886
Claims priority, application Germany, Jan. 25, 1962, F 35,844
5 Claims. (Cl. 8—55)

It has been found that polyalkylene glycol ethers of the general formula

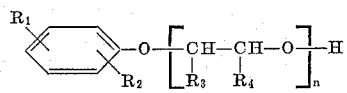

wherein $R_1$ denotes an aliphatic hydrocarbon radical with 6–18 carbon atoms, a cycloaliphatic hydrocarbon radical, an aromatic hydrocarbon radical, or an araliphatic hydrocarbon radical, and $R_2$, independently of $R_1$, is one of the hydrocarbon radicals specified for $R_1$, a lower alkyl radical, or hydrogen, and wherein the substituents $R_3$ and $R_4$ either both represent hydrogen or one stands for hydrogen and the other for a methyl group, whilst $n$ is an integer from 8 to 14, preferably 10, are exceedingly suitable as levelling agents for dyeings on polyester products with dispersion dyestuffs.

The polyalkylol ethers to be employed according to the invention are obtainable by methods known per se, from appropriately substituted phenolic compounds, for example phenolic compounds carrying isononyl, cyclohexyl, phenyl, or benzyl substituents, by reaction with ethylene oxide and/or propylene oxide, for instance according to the method described in German patent specification 767,842. Convenient proportions by weight of the polyalkylene glycol ethers can readily be established by preliminary experiments; in general, amounts of 0.2–2 percent by weight, referred to the goods for dyeing, will suffice. It has proved a particular advantage to use mixtures of the polyalkylene glycol ethers to be employed according to the invention, and in fact mixtures from those compounds which correspond to the general formula specified above where $R_2$ stands for a lower alkyl radical or for hydrogen and from those compounds which correspond to the formula specified above where $R_2$ stands for an araliphatic radical; in general, it is advisable in that case to apply the mixture components in about equal amounts by weight.

Furthermore it has been found that the levelling action of the polyalkylene glycol ethers proposed can be considerably improved when polyalkylene glycol esters of fatty acids are employed in conjunction with them. The esters which are obtainable from unsaturated fatty acids, such as oleic acid, by the action of ethylene oxide in the molar proportion of 1:5–10 have proved to be particularly suitable. The ratio of the poly-glycol esters of fatty acids to the polyalkylene glycol ethers may vary within wide limits; in general, it is recommended to employ 1–2 parts by weight of polyalkylene glycol ether per 1 part by weight of polyalkylene glycol ester of fatty acid, the polyalkylene glycol ethers being present in the form of homogeneous compounds or in the form of mixtures.

It is possible with the aid of the levelling agents of the invention to attain dyeings of excellent uniformity at temperatures between 98 and 130° C. with dispersion dyestuffs on products of the widest variety, such as fibres, threads, fabrics, or knitted goods produced from polyesters, for example from terephthalic acid and ethylene glycol or from terephthalic acid and 1,4-di(hydroxymethyl)-cyclohexane, or subsequently to level dyeings obtained with dispersion dyestuffs which had turned out to be uneven.

As dispersion dyestuffs, there may be used the dyestuffs known by this term (in this respect, cf., for example, Diserens: "Die neuesten Fortschritte in der Anwendung der Farbstoffe," volume 2, page 254 et seq.).

The following examples are given for the purpose of illustrating the invention.

*Example 1*

Worsted polyester fibre, produced from terephthalic acid and ethylene glycol, is introduced into an aqueous dyebath at 60° C. at a liquor-to-goods ratio of 10:1 which contains, per litre, 3 g. of the dispersion dyestuff 4-(p-toluidino-)-1-hydroxyanthraquinone and 0.5 g. of the polyethylene glycol ether of the formula

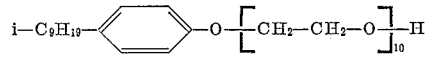

The temperature of the bath is gradually raised to 120° C. and the bath is kept at this temperature for about 1 hour. A completely uniform deep blue dyeing is obtained.

*Example 2*

Gross wound yarn from polyester threads, which had been produced from terephthalic acid and ethylene glycol, is introduced into an aqueous dye bath at 80° C. at a liquor-to-goods ratio of 15:1, which contains, per litre, 0.4 g. of the dispersion dyestuff 1-amino-4-hydroxy-2-bromo-anthraquinone and 0.7 g. of the polyethylene glycol ether of the formula

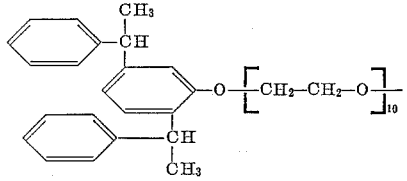

The temperature of the bath is gradually raised to 120° C. and the bath is kept at this temperature for about 1 hour. A red dyeing of excellent uniformity is obtained.

*Example 3*

A yarn of polyester fibres, proudced from terephthalic acid and ethylene glycol, which had been unevenly dyed on a cross-wound bobbin with 3% of the dispersion dyestuff 4-(p-toluidino)-1-hydroxyanthraquinone, is introduced into an aqueous bath at 90° C. at a liquor-to-goods ratio of 20:1 which contains, per litre, 0.25 g. of the polyethylene glycol ether of the formula

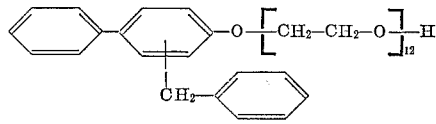

and 0.25 g. of the polyethylene glycol ether of the formula

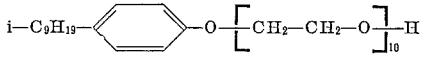

The temperature of the bath is then increased to 130° C., and the bath is kept at this temperature for 1 hour. The yarn which had previously been dyed unevenly now now exhibits a completely uniform dyeing.

The excellent levelling effect of the polyalkylol ethers to be employed according to the invention is also demonstrated by the following experiment:

A yarn of polyester fibres, produced from terephthalic acid and ethylene glycol, which had been unevenly dyed on a cross-wound bobbin with 3% of the dispersion dyestuff 4-(p-toluidino)-1-hydroxyanthraquinone, are surrounded by winding an equal weight of white undyed yarn of polyester fibres about them. The wound bobbin is then treated in an aqueous bath as described above, at a liquor-to-goods ratio of 20:1. During this treatment, complete equalisation is attained between the yarn of polyester fibres which had already been dyed and that which had not been dyed. The resultant wound bobbin has been uniformly dyed blue from the inner layer of yarn to the outer layer of yarn.

*Example 4*

Worsted material from polyester fibres which had been produced from terephthalic acid and ethylene glycol is introduced into an aqueous dye-bath at 60° C. at a liquor-to-goods ratio of 10:1, which contains, per litre, 1 g. of the dispersion dyestuff according to paragraph 1 of Example 1 of German Patent 1,026,506, 0.4 g. of the polyethylene glycol ether of the formula

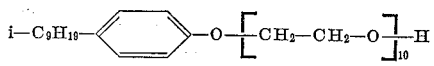

0.2 g. of the polyethylene glycol ether of the formula

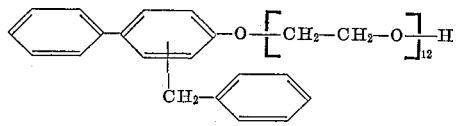

and 0.4 g. of oleic acid octaethylene glycol ester. The temperature of the bath is gradually raised to 120° C. and the bath is kept at this temperature for about 1 hour. A completely homogeneous pale blue dyeing is obtained.

*Example 5*

A yarn of polyester fibres produced from terephthalic acid and ethylene glycol, which had been unevenly dyed on a cross-wound bobbin with 3% of the dispersion dyestuff 4-(p-toluidino)-1-hydroxyanthraquinone is introduced into an aqueous bath at 90° C. at a liquor-to-goods ratio of 20:1 which contains, per litre, 0.32 g. of the polyethylene glycol ether of the formula

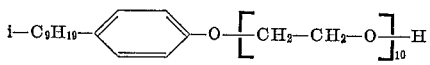

and 0.18 g. of oleic acid hexaethylene glycol ester. The temperature of the bath is then increased to 130° C. and the bath is kept at this temperature for 1 hour. The yarn which had previously been unevenly dyed now exhibits a completely homogeneous dyeing.

I claim:
1. A process for dyeing polyester material with a dispersion dyestuff consisting in inserting the material into a dyebath containing (1) a levelling agent of the formula

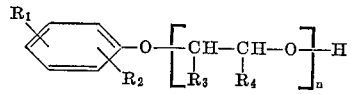

wherein $R_1$ is a member selected from the group consisting of an aliphatic hydrocarbon of 6–18 carbon atoms, cycloaliphatic and araliphatic hydrocarbon; $R_2$ is a member selected from the group consisting of a hydrocarbon defined as $R_1$, lower alkyl and hydrogen; $R_3$ and $R_4$ are members selected from the group consisting of hydrogen and methyl, not more than 1 methyl group being employed at a time; and $n$ is an integer of 8–14; and (2) a polyalkylene glycol ester consisting of the reaction product of
(a) a fatty acid with
(b) an alkylene oxide;
the ratio of (a) to (b) being about 1:5–10 and the ratio of (2) to (1) in the dyebath being 1:1–2; raising the temperature of the dyebath to a maximum not exceeding about 130° C.; and thereafter washing and recovering the dyed polyester material.

2. The process of claim 1 wherein (a) is an unsaturated fatty acid.

3. A process of claim 1 wherein the concentration of levelling agent is about .2%–2% by weight of the polyester products.

4. A process of claim 1 wherein the ratio of liquor-to-goods is 10–20:1.

5. A process of claim 1 wherein polyester fibers are introduced into an aqueous dispersion dye bath containing about .03% by weight of a levelling agent having the formula

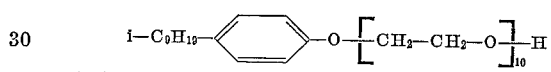

and about .02% by weight of oleic acid hexaethylene glycol ester, at a ratio of liquor-to-goods of 20:1, gradually raising and holding the temperature of the bath from 90° C. to 130° C.

References Cited by the Examiner

UNITED STATES PATENTS 2,828,180   3/1958   Sertorio.
2,880,050   3/1959   Fortress.

FOREIGN PATENTS 839,130   6/1960   Great Britain.

OTHER REFERENCES

Carbonell, Textile Praxis, 1961, vol. 16, pp. 501 to 510.
Du Pont Technical Information Bulletin D–73, February 1956, pp. 6–8, Pub. by E. I. du Pont de Nemours & Co., Wilmington, Del.
Merian et al., Textile Rdsch, 1961, vol. 16, pages 181 to 184.
Review of Textile Progress, 1961, page 340, pub. 1962 by Butterworths & Co., London, England.

NORMAN G. TORCHIN, *Primary Examiner.*

ABRAHAM H. WINKELSTEIN, *Examiner.*